US010400483B2

(12) United States Patent
Sims

(10) Patent No.: US 10,400,483 B2
(45) Date of Patent: *Sep. 3, 2019

(54) HANDCUFFS AND METHODS OF MAKING AND USING SAME

(71) Applicant: Roger Sims, Edmond, OK (US)

(72) Inventor: Roger Sims, Edmond, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,105

(22) Filed: Jul. 5, 2018

(65) Prior Publication Data

US 2018/0320417 A1 Nov. 8, 2018

Related U.S. Application Data

(63) Continuation of application No. 15/381,579, filed on Dec. 16, 2016, now Pat. No. 10,036,184.

(60) Provisional application No. 62/268,182, filed on Dec. 16, 2015.

(51) Int. Cl.
*E05B 75/00* (2006.01)
*A01K 15/04* (2006.01)

(52) U.S. Cl.
CPC .............. *E05B 75/00* (2013.01); *A01K 15/04* (2013.01)

(58) Field of Classification Search
CPC ........ E05B 75/00; E05B 75/005; A01K 15/04
USPC ........ 70/15–17; 119/778, 816; 128/878, 879
See application file for complete search history.

(56) References Cited

U.S. PATENT DOCUMENTS

| 435,109 | A | * | 8/1890 | Woodcock | |
|---|---|---|---|---|---|
| 738,983 | A | | 9/1903 | Burdick | |
| 1,020,437 | A | * | 3/1912 | Nelson | B65D 45/16 220/326 |
| 1,803,280 | A | | 4/1931 | Stull et al. | |
| 2,966,787 | A | * | 1/1961 | Tompkins | E05B 75/00 70/16 |
| 3,616,665 | A | | 11/1971 | Rosenthal | |
| 3,618,345 | A | * | 11/1971 | Smith | E05B 75/00 70/16 |
| 4,138,867 | A | * | 2/1979 | Tompkins | E05B 75/00 70/16 |
| 4,840,048 | A | | 6/1989 | Elam | |
| 5,461,890 | A | | 10/1995 | LeFavor | |
| 5,526,658 | A | | 6/1996 | Cross et al. | |
| 5,555,751 | A | | 9/1996 | Strickland et al. | |
| 5,680,781 | A | | 10/1997 | Bonds et al. | |
| 5,687,593 | A | * | 11/1997 | Cross | E05B 75/00 119/819 |
| 6,588,240 | B2 | * | 7/2003 | Anderson | E05B 75/00 16/327 |
| 6,637,242 | B2 | | 10/2003 | Masters | |
| 6,886,374 | B2 | | 5/2005 | Clifton, Jr. | |
| 6,886,375 | B2 | * | 5/2005 | Amo | E05B 75/00 403/105 |
| 7,010,943 | B1 | | 3/2006 | Earl | |

(Continued)

*Primary Examiner* — Lloyd A Gall
(74) *Attorney, Agent, or Firm* — Hall Estill Law Firm

(57) ABSTRACT

The present disclosure is directed to a pair of handcuffs and method of making and using the handcuffs. Each handcuff includes a wristlet and a gripping portion. Each handcuff is connected to the other. Each wristlet is capable of being positioned about a wrist of a first individual. Each gripping portion is attached to a wristlet such that each gripping portion is positioned so that a second individual can grip the gripping portion when using the handcuffs.

14 Claims, 12 Drawing Sheets

(56) References Cited

U.S. PATENT DOCUMENTS

| | | | |
|---|---|---|---|
| 7,017,234 B2* | 3/2006 | Anderson | E05B 75/00 16/319 |
| 7,210,317 B2* | 5/2007 | Beane | E05B 63/0056 128/878 |
| 8,230,706 B1* | 7/2012 | Amo | E05B 75/00 70/15 |
| 8,522,581 B2 | 9/2013 | Thompson | |
| 10,036,184 B1* | 7/2018 | Sims | E05B 75/00 |
| 2002/0000109 A1 | 1/2002 | Masters | |
| 2002/0166350 A1 | 11/2002 | MacAleese et al. | |
| 2002/0189302 A1* | 12/2002 | Anderson | E05B 75/00 70/16 |
| 2005/0097929 A1* | 5/2005 | Anderson | E05B 75/00 70/16 |
| 2007/0056332 A1 | 3/2007 | Parsons et al. | |
| 2007/0256461 A1* | 11/2007 | Parsons | E05B 75/00 70/16 |
| 2010/0018263 A1 | 1/2010 | Ben Yehuda | |
| 2010/0206017 A1 | 8/2010 | Garibaldi | |
| 2010/0269548 A1 | 10/2010 | Harrington | |
| 2013/0133382 A1 | 5/2013 | Thompson | |
| 2015/0068256 A1 | 3/2015 | Flynn | |

* cited by examiner

HANDCUFFS AND METHODS OF MAKING AND USING SAME

CROSS REFERENCE TO RELATED APPLICATIONS/INCORPORATION BY REFERENCE STATEMENT

The present application is a continuation of U.S. Ser. No. 15/381,579, filed Dec. 16, 2016, now U.S. Pat. No. 10,036,184, which claims priority and benefit under 35 U.S.C. 119(e) to U.S. Ser. No. 62/268,182, filed on Dec. 16, 2015, the entire contents of all which are hereby expressly incorporated herein by reference.

FIELD OF THE INVENTION

The present disclosure relates generally to handcuffs, and more particularly, not by way of limitation, to improved handcuffs for allowing more leverage and control of an individual.

BACKGROUND OF THE INVENTION

Law enforcement personnel and prison guards routinely use handcuffs for individual/prisoner restraint. Conventional handcuffs are generally of standardized construction and include a pair or wristlets pivotally and rotatably connected by a short link chain. There are various handcuffing techniques and methods and individuals are handcuffed in different conditions and environments. Each situation presents its own unique set of problems and challenges. The most popular method to hold cuffs is called a pistol grip. When a traditional handcuff is removed from the pouch, the officer is trained to wrap their hand around the chain or metal between the cuffs. The problem is every officer's hand size and strength is different. The single swinging bar must be facing the offender to be in the correct position to apply them. This requires the officer to look at the cuffs and adjust them all the while trying to keep an eye on the offender's hands, movements and demeanor. Those few seconds leaves the officer exposed and in a vulnerable position. If the officer accidently pushes the double bar on the offender it can injure or anger him/her. It can change a compliant individual into a very aggressive and dangerous person simply because the officer failed to correctly position the single bar toward the offender.

To this end, a need exists for an improved pair of handcuffs that provides more leverage and a better grip that allows for more control of the individual than currently is provided in existing handcuffs. It is to such a device that the present disclosure is directed.

BRIEF DESCRIPTION OF THE DRAWING(S)

DETAILED DESCRIPTION OF THE INVENTION

Figure 1:
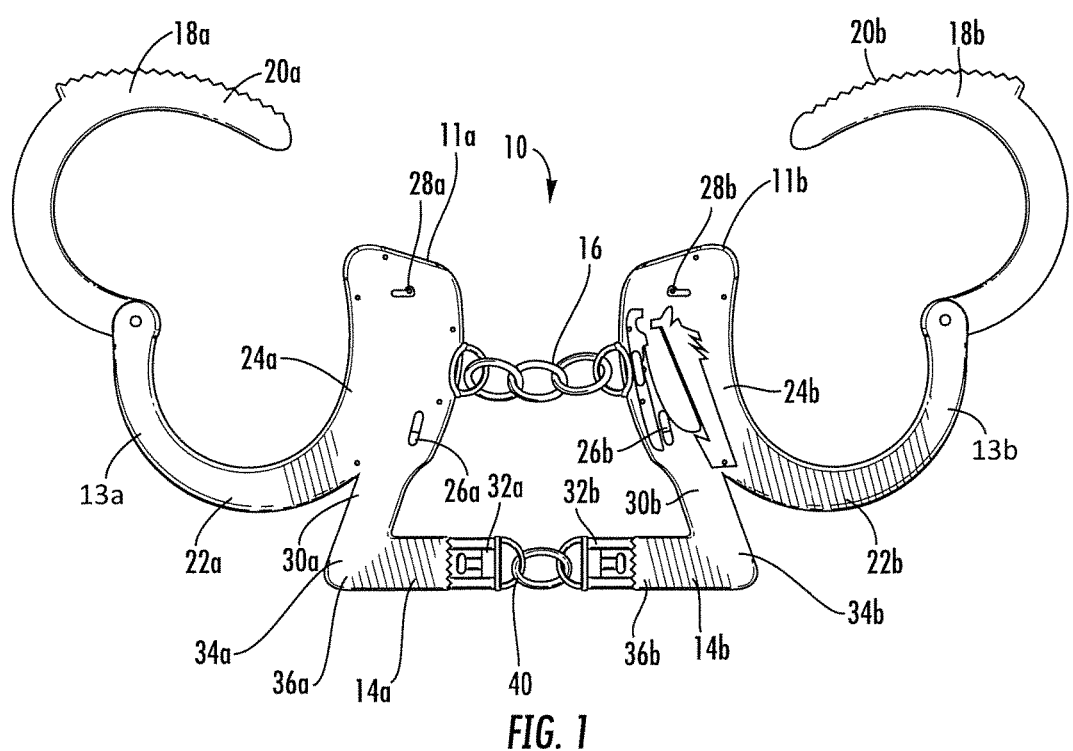
FIG. 1 is a front view of one embodiment of a pair of handcuffs constructed in accordance with the present disclosure.

Before explaining at least one embodiment of the inventive concept disclosed herein in detail, it is to be understood that the inventive concept is not limited in its application to the details of construction, experiments, exemplary data, and/or the arrangement of the components set forth in the following description, or illustrated in the drawings. The presently disclosed and claimed inventive concept is capable of other embodiments or of being practiced or carried out in various ways. Also, it is to be understood that the phraseology and terminology employed herein is for purpose of description only and should not be regarded as limiting in any way.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and more particularly to FIG. 1, shown therein is an exemplary embodiment of a pair of handcuffs 10 constructed in accordance with the inventive concepts disclosed herein. The handcuffs 10 are manufactured from various metals, including carbon steel, stainless steel and aluminum, or from synthetic polymers. It should be understood by one of ordinary skill in the art that any such material may be utilized in the construction and manufacture of the handcuffs so long as the handcuffs operate as described herein. Further, it should be understood that various methods known in the art may be utilized for constructing and manufacturing the various embodiments of the handcuffs as described and shown herein.

The handcuffs 10 include a pair of handcuff portions 11a and 11b. The handcuff portions 11a and 11b are constructed identically to one another. For purposes of brevity, the construction of only one of the handcuff portions 11 will be described hereinafter, unless otherwise described. Additionally, only one handcuff portion will be described for the various handcuff embodiments described hereinafter, unless otherwise described. For the various embodiments shown and/or described herein, similar numbers will be used to identify similar elements and will be distinguished by using the letters a and b with the similar numbers, unless otherwise described. It will be understood by one of ordinary skill in the art that various embodiments of handcuff portions will be connected together by various methods for connecting one item to another and will function together as described herein and/or as known in the art.

The handcuff portion 11 has a wristlet 13 and a gripping portion 14. The wristlets 13 are pivotally and rotatably connected by a link chain 16. Each wristlet 13 includes a ratchet bar 18 having ratchet teeth 20 pivotally connected to a double strand wristlet body 22 having internal teeth (not shown) which permit rotation of the ratchet bar 18 only inwardly therethrough, but prevent withdrawal in the opposite direction. Each wristlet 13 further includes an enlarged body portion 24 in which a double locking mechanism 26 lockingly engaging the ratchet bar 18 and for fixing the circumference of the wristlet 13 is housed. A key hole 28 is also provided to release the locking mechanism 26.

Figure 2:
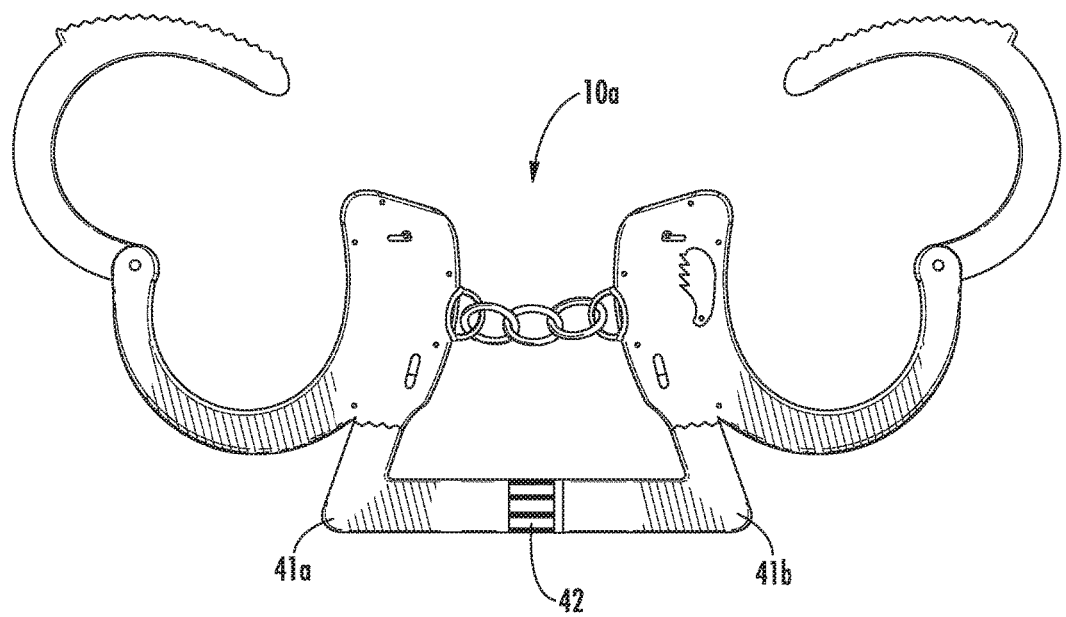
FIG. 2 is a front view of an alternative embodiment of a pair of handcuffs constructed in accordance with the present disclosure.

Each gripping portion 14 includes a first end 30, a second end 32, a first portion 34 and a second portion 36 such that the first portion 34 and the second portion 36 are constructed in an L-shaped configuration. However, it should be understood that the gripping portion 14 may be various shaped configurations (for example, but not by way of limitation, FIGS. 3 and 4) so long as the gripping portion 14 allows a user to grip the handcuff and functions in accordance with the present disclosure as described and shown herein. The first portion 34 is connected to the enlarged body portion 24 at the first end 30 of the gripping portion 14 such that each of the second portions 36 are positioned so that each second end 32 may be connected to one another with a swiveled chain link 40. In an alternative embodiment, handcuffs 10a, similar in construction to the handcuffs 10, include second portions 41a and 41b connected with a hinge 42 (FIG. 2) so that the handcuff portions are foldable to occupy less space.

Figure 3:
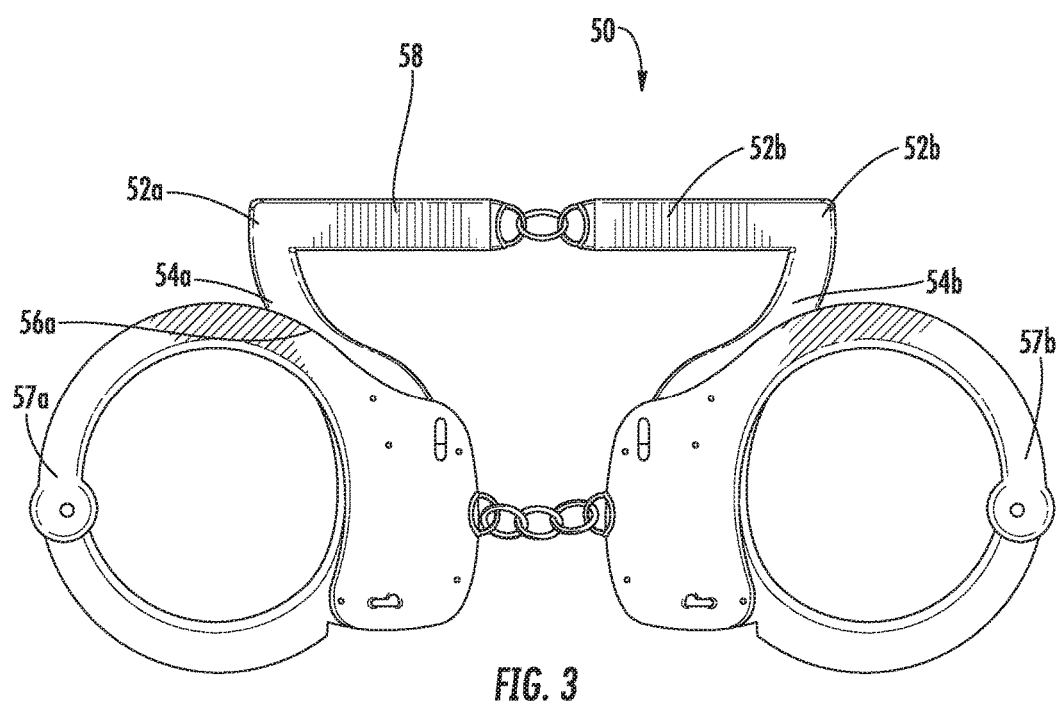
FIG. 3 is a front view of an alternative embodiment of a pair of handcuffs constructed in accordance with the present disclosure.

Referring to FIG. 3, a pair of handcuffs 50 are shown constructed in accordance with the present disclosure. The pair of handcuffs 50 are similar to the handcuffs 10, except that a gripping portion 52 is provided with a substantially curved first portion 54 that is positioned and/or formed along a portion 56 of a wristlet 57. The gripping portion 52 is formed as a part of the wristlet 57 or may be connected to a conventional wristlet in any of various methods for connecting one material to another. A second portion 58 of the gripping portion 52 is substantially perpendicular to the first portion 54.

Figure 4:
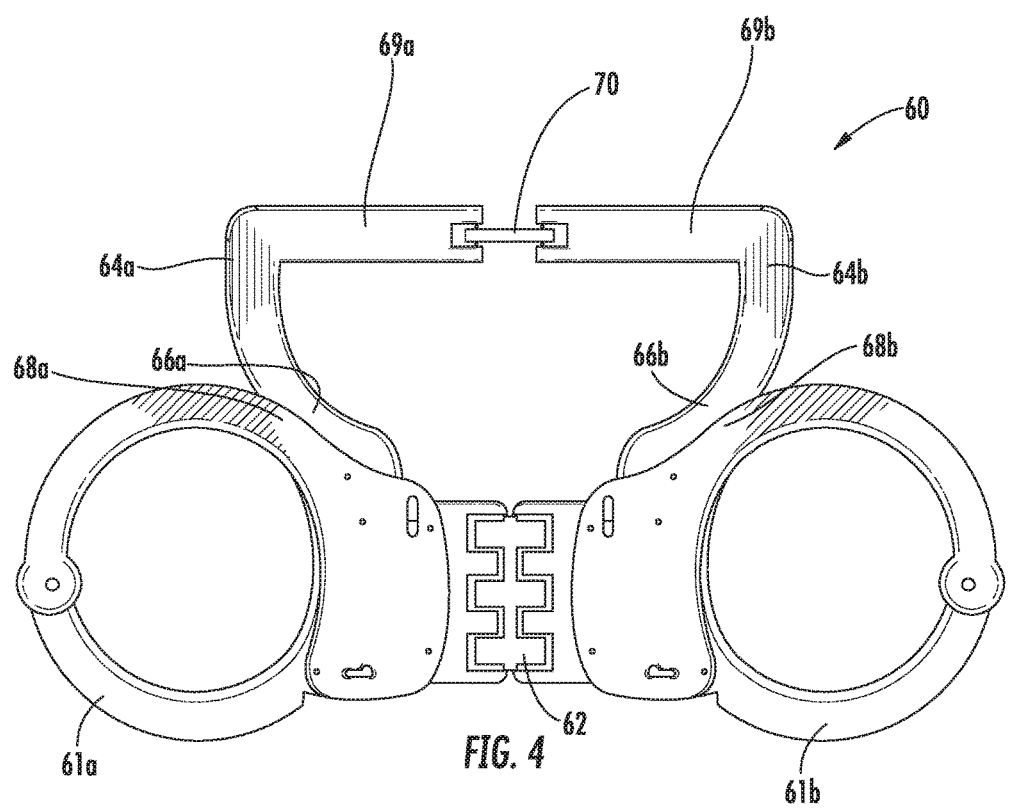
FIG. 4 is a front view of an alternative embodiment of a pair of handcuffs constructed in accordance with the present disclosure.

Referring to FIG. 4, a pair of handcuffs 60 are shown constructed in accordance with the present disclosure. The pair of handcuffs 60 are similar to the handcuffs 10, except that the wristlets 61 are connected with a hinge 62 and the gripping portion 64 is provided with a substantially curved first portion 66 that is positioned and or formed along a portion 68 of the wristlet 61. A second portion 69 is substantially perpendicular to the curved first portion 66. Each of the second portions 69a and 69b are connected with a hinge 70.

Figure 5:
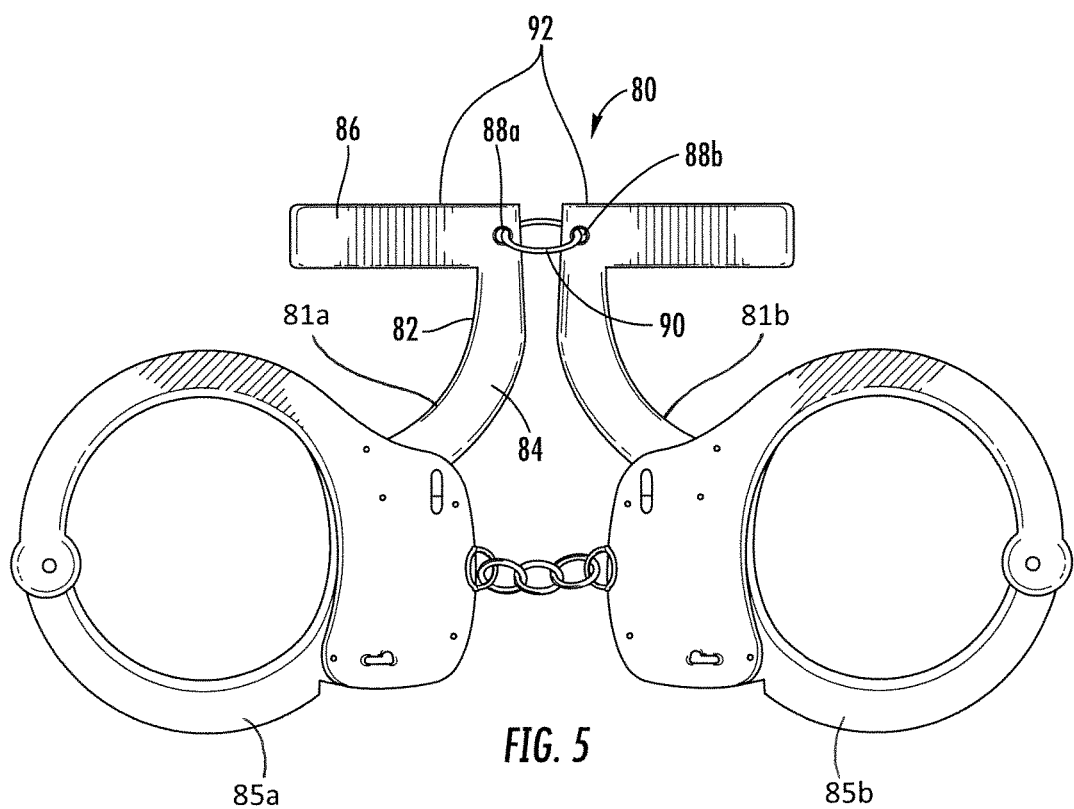
FIG. 5 is a front view of an alternative embodiment of a pair of handcuffs constructed in accordance with the present disclosure.

Referring to FIG. 5, a pair of handcuffs 80 are shown constructed in accordance with the present disclosure. The pair of handcuffs 80 are similar to the handcuffs 10, except that each handcuff portion 81 includes a gripping portion 82 having a first portion 84 and a second portion 86. Each of the first portions 84 are curved and connected to or formed from to extend from a portion of a wristlet 85. Each second portion 86 is perpendicular to the first portion 84. Each of the gripping portions 82 are connected to one another at an end 88 with a chain 90. A substantially T-shaped configured handle 92 is formed when the handcuff portions 81 are opened. A user may grip the handle 92 when using the handcuffs 80 as described herein.

Figure 6:
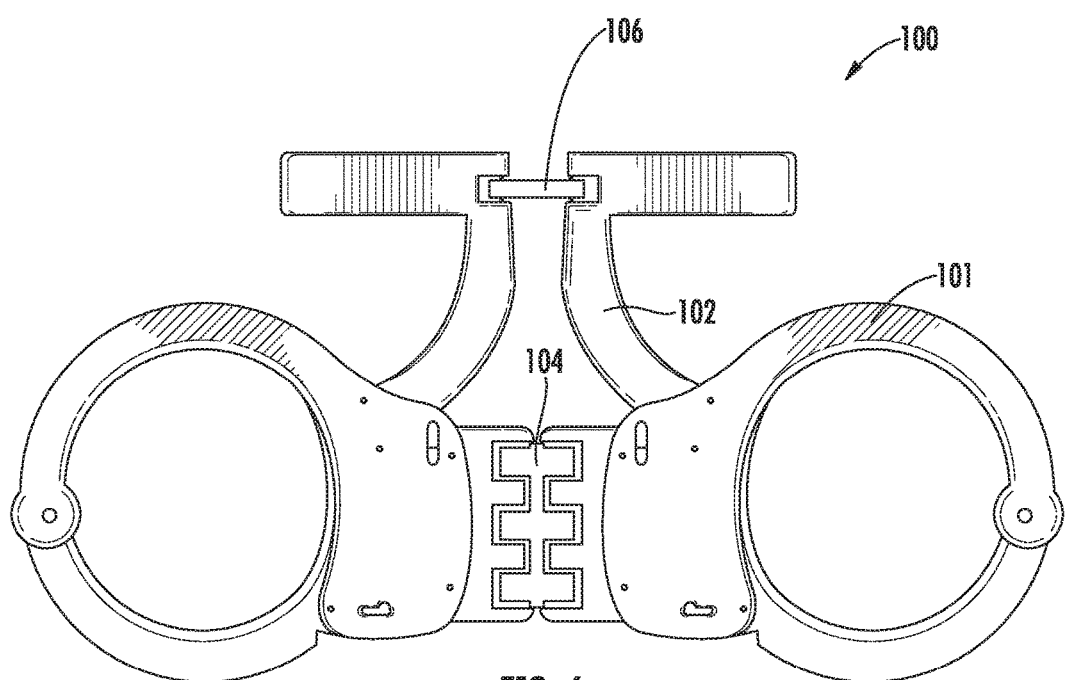
FIG. 6 is a front view of an alternative embodiment of a pair of handcuffs constructed in accordance with the present disclosure.

Referring now to FIG. 6, a pair of handcuffs 100 are shown constructed in accordance with the present disclosure. The pair of handcuffs 100 are similar to the handcuffs 80, except that wristlets 101 and the gripping portions 102 are connected with hinges 104 and 106.

Figure 7:
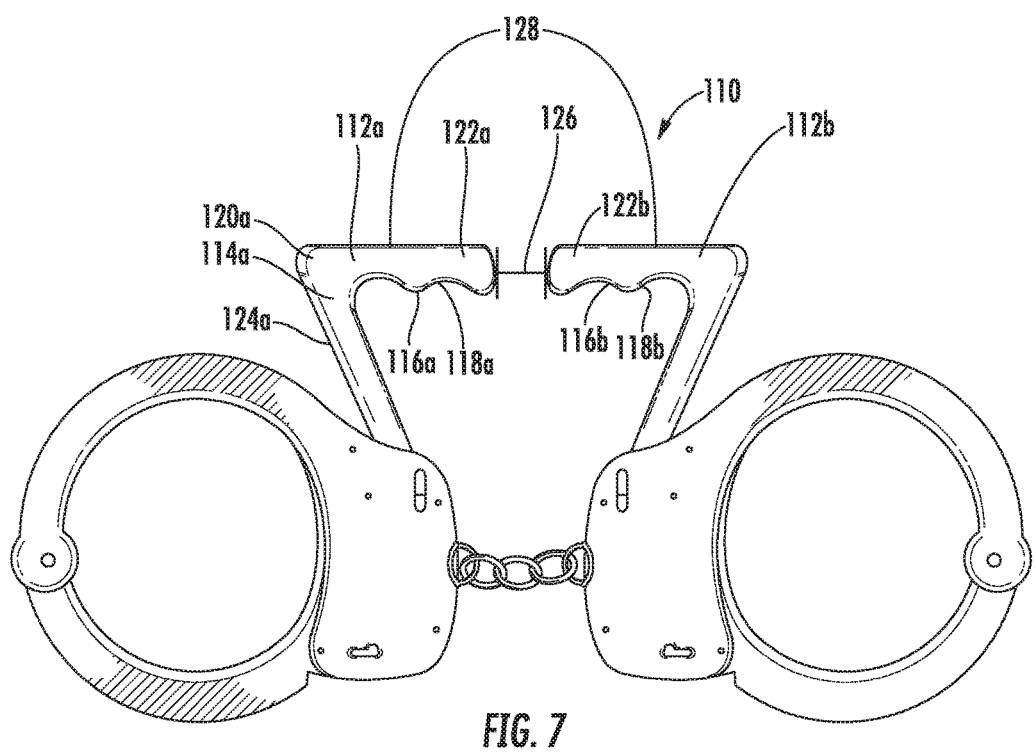
FIG. 7 is a front view of an alternative embodiment of a pair of handcuffs constructed in accordance with the present disclosure.

Referring to FIG. 7, a pair of handcuffs 110 are shown constructed in accordance with the present disclosure. The pair of handcuffs 110 are similar to the handcuffs 10, except that a second portion 112 of a gripping portion 114 includes a first side 116 having a hand grip portion 118. The second portion 112 has a first end 120 and a second end 122. The first end 120 is connected to a first portion 124. The gripping portions 114 are constructed in a substantially L-shaped configuration such that a space or gap 126 exists a distance between second ends 122a and 122b. When the handcuffs 110 are opened, the hand grip portions 118 form a handle 128 or spine for a user to grip to use the handcuffs 110.

Figure 8:
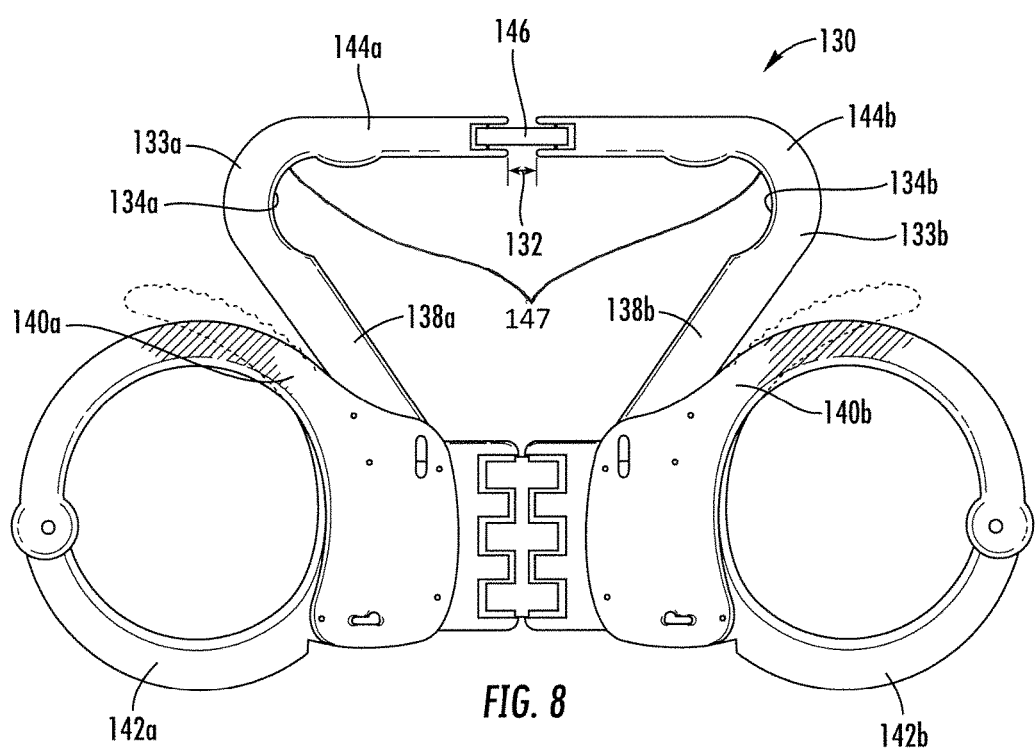
FIG. 8 is a front view of another embodiment a pair of handcuffs constructed in accordance with the present disclosure.

FIG. 8 shows a pair of handcuffs 130 constructed in accordance with the present disclosure. The pair of handcuffs 130 are similar to the handcuffs 60, except that the distance of a hinge gap 132 between the ends 134 of second portions 144 is shortened to reduce the chance of pinching the hand or fingers when in use. Gripping portions 133 are provided with a substantially curved, corner finger portion 134. When the handcuffs 130 are in an extended or open position, the gripping portions 133 form a handle or spine 147 to grip by a hand of a user. The finger portions 134 allow for fixed placement for the fingers of the user's hand when gripping the handcuffs 130. A first portion 138 that is positioned or formed along a portion 140 of a wristlet 142 and a second portion 144 is substantially perpendicular to the first portion 138 such that each of the second portions 144a and 144b are connected with a hinge 146.

Figure 9:
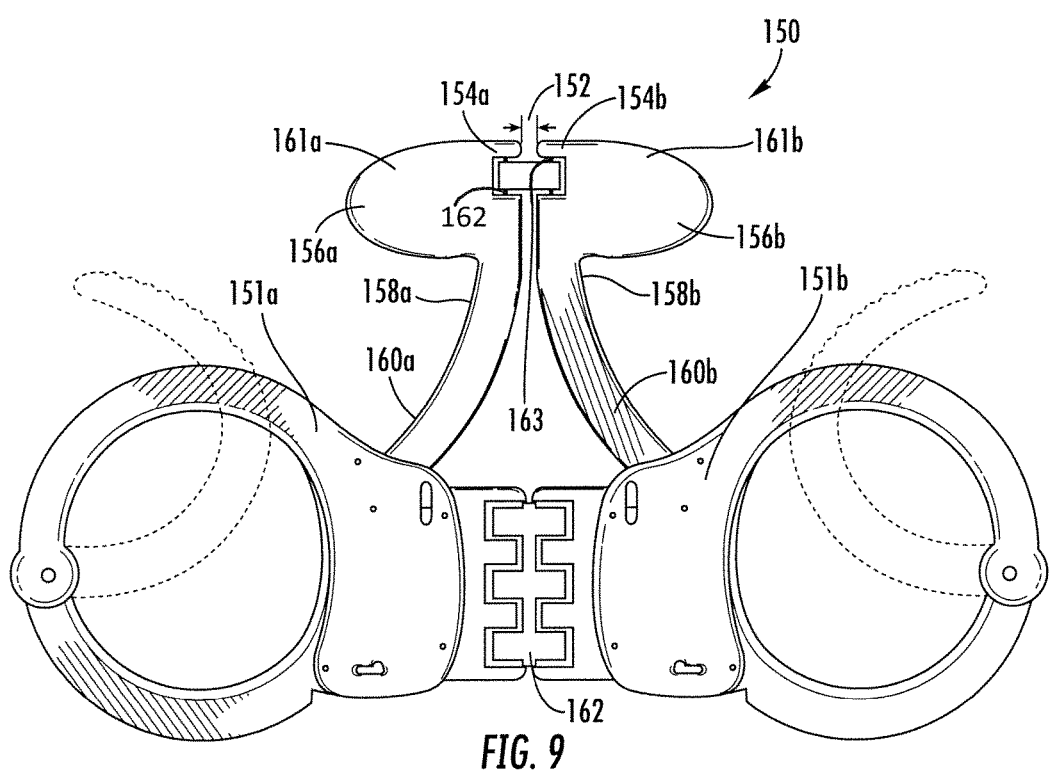
FIG. 9 is a front view of another embodiment a pair of handcuffs constructed in accordance with the present disclosure.

Referring now to FIG. 9, a pair of handcuffs 150 are shown constructed in accordance with the present disclosure. The pair of handcuffs 150 are similar to the handcuffs 80, except that a distance of a hinge gap 152 between the ends 154 of second portions 156 of a gripping portion 158 is shortened to reduce the chance of pinching the hand or fingers when in use. A substantially curved first portion 160 of the gripping portion 158 is lengthened and the second portion 156 of the gripping portion 158 is thickened to provide a better grip for the user. When the handcuffs 150 are in an extended or open position, the second portions 156 of the gripping portions 158 form a handle 161 or spine to be gripped by a hand of a user. The handcuff portions 151a and 151b are connected with hinges 162 and 163.

Figure 10:
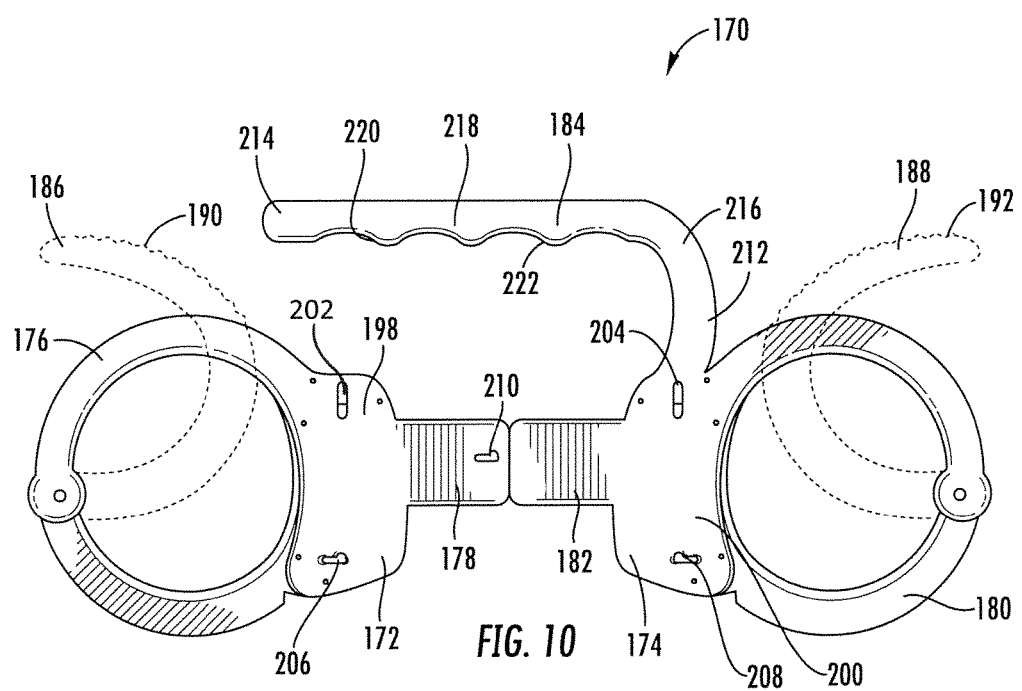
FIG. 10 is a front view of an alternative embodiment of a pair of handcuffs constructed in accordance with the present disclosure.

Referring to FIG. 10, a pair of handcuffs 170 are shown constructed in accordance with the present disclosure. The handcuffs 170 include a first handcuff portion 172 and a second handcuff portion 174. The first handcuff portion 172 has a wristlet 176 and a connecting portion 178. The second handcuff portion includes a wristlet 180, a connecting portion 182 and a gripping portion 184. Each wristlet 176 and 180 includes a ratchet bar 186 and 188, respectively, having ratchet teeth 190 and 192, respectively, pivotally connected to a double strand wristlet body, respectively, having internal teeth (not shown) which permit rotation of the ratchet bars 186 and 188 only inwardly therethrough, but prevent withdrawal in the opposite direction. Each wristlet 176 and 180 further includes an enlarged body portion 198 and 200, respectively, in which a double locking mechanism 202 and 204, for lockingly engaging the ratchet bar 186 and 188 and for fixing the circumference of the wristlet 176 and 180, is housed. A key hole 206 and 208, respectively, is also provided to release the locking mechanism 202 and 204, respectively.

The connecting portions 178 and 182 contain a spring loaded mechanism 210 which connects the first handcuff portion 172 and the second handcuff portion 174. A spring exerts constant pressure on the first and second handcuff portions 172 and 174 in a closed position. The first and second handcuff portions 172 and 174 are held in the closed position by the mechanism. The handcuffs 170 are placed in a case and when removed from the case, the stored energy is released and the spring exerts the first and second handcuff portions 172 and 174 to open the handcuffs 170 and lock the handcuffs 170 into a ready position. The spring loaded mechanism may also be released by depressing a button or some other type of tab, lever, or the like.

The gripping portion 184 includes a first end 212, a second end 214, a first portion 216 and a second portion 218 such that the first portion 216 and the second portion 218 are constructed in an r-shaped configuration. However, it should be understood that the gripping portion 184 may be various shaped configurations, so long as the gripping portion 184 allows a user to grip the handcuff and functions in accordance with the present disclosure as described and shown herein. The first portion 216 of the gripping portion is connected to the enlarged body portion 200 of the second handcuff portion 174. One side 220 of the second portion 218 of the gripping portion 184 is provided with finger grooves 222 for easier gripping of the handcuffs 170.

The handcuffs 10 are an ergonomic handcuff that is safer and easier to apply and more efficient than current handcuff models or versions available. It eliminates the things that makes traditional handcuffs difficult to use and, at times, what makes them dangerous.

Figure 11:
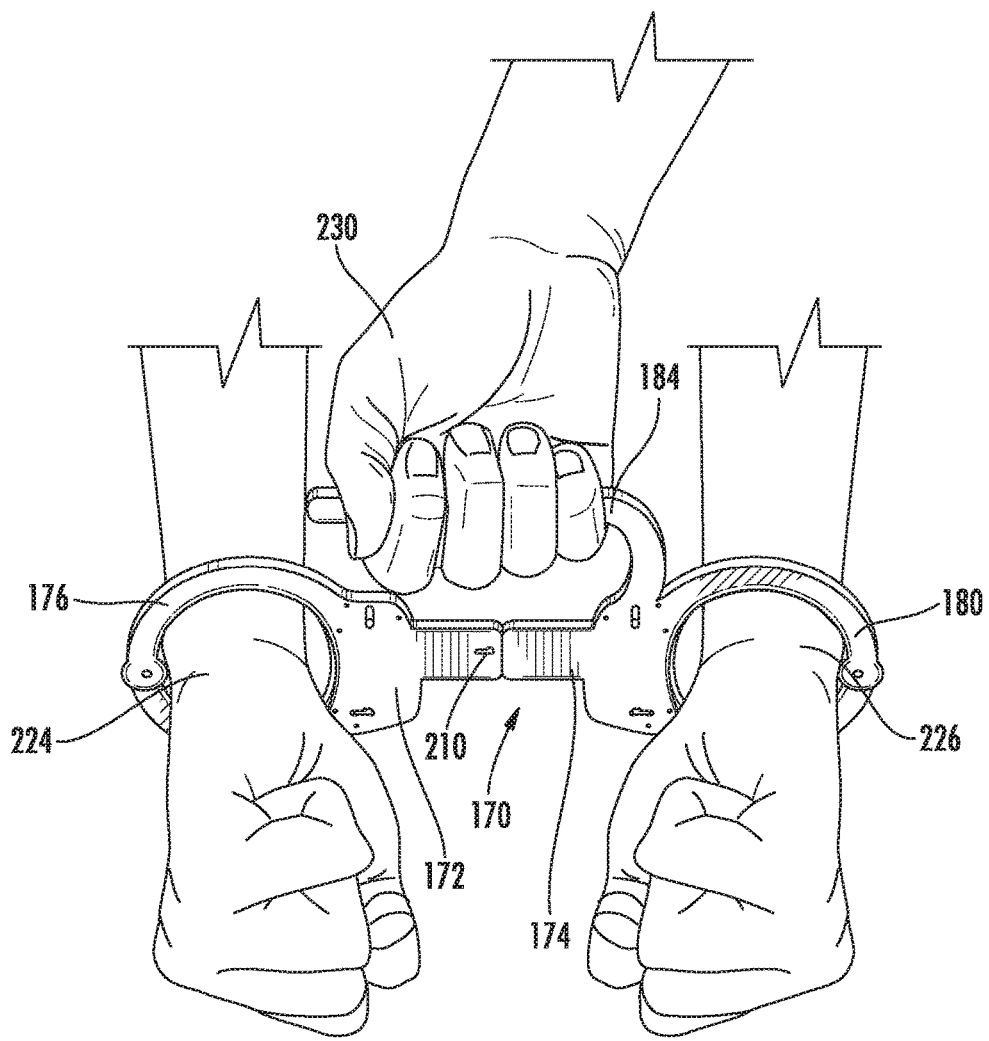
FIG. 11 shows one embodiment of a pair of handcuffs constructed in accordance with the present disclosure secured about the wrists of an individual.

Referring to FIG. 11, the handcuffs 170 are shown in use by being secured to the wrists 224 and 226 of an individual by a user 230. The handcuffs 170 are removed from a case or carrier (not shown) worn by the user 230. The stored energy from the spring in the handcuffs 170 is released and the spring exerts the first and second handcuff portions 172 and 174 to open and lock into a ready position. The user having a grip on the gripping portion, places each wristlet 176 and 180 about separate wrists 224 and 226, respectively, of the individual. When the user 230 is finished with needing the handcuffs 170, the handcuffs 170 are removed from the wrists of the individual and stored for future use.

Figure 12:
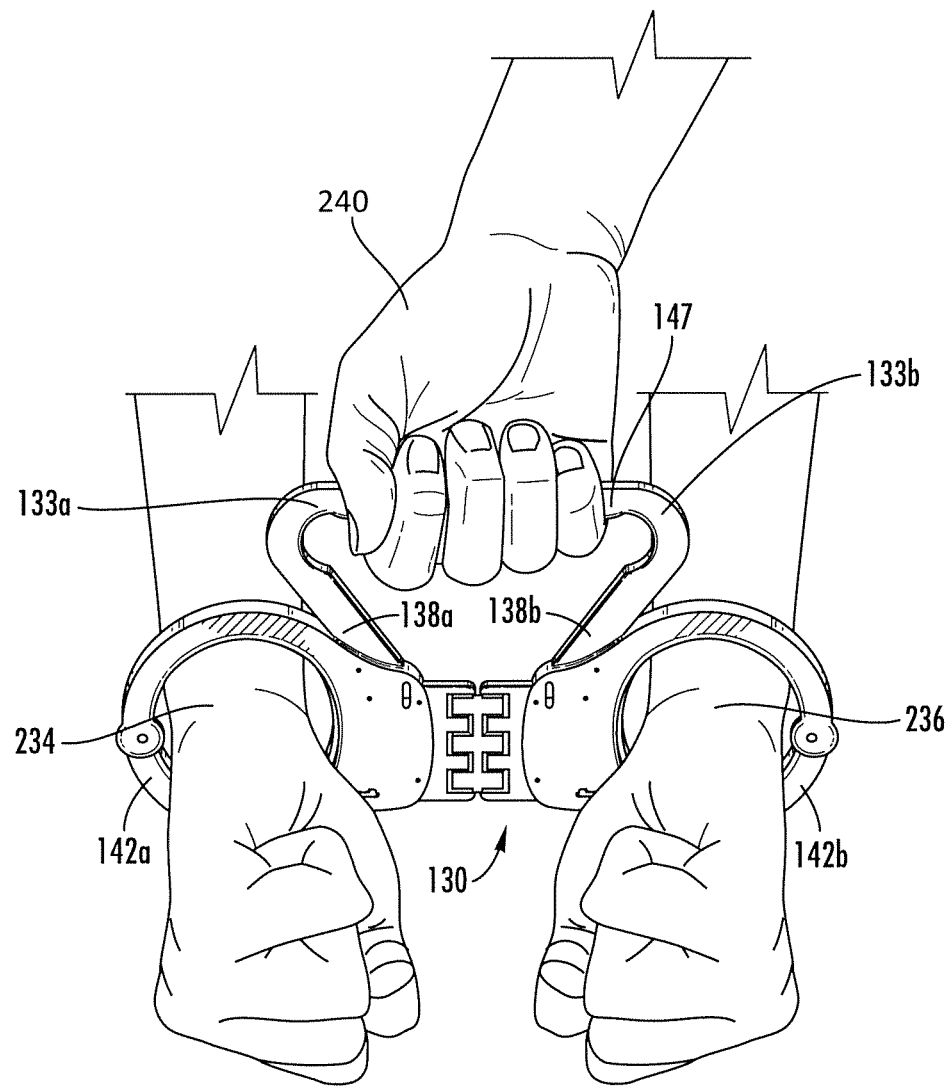
FIG. 12 shows another embodiment of a pair of handcuffs constructed in accordance with the present disclosure secured about the wrists of an individual.

Referring now to FIG. 12, the handcuffs 130 are shown secured to the wrists 234 and 236 of an individual by a user 240. It should be understood that various embodiments of handcuffs discussed herein are operated similar to the handcuffs 130. The handcuffs 130 are removed from a case or carrier (not shown) worn by the user 240. When stored, the handcuffs 130 are in a folded or closed position. The gripping portions 133 are unfolded or opened into the open positions which aligns the gripping portions 133 to form the handle 147 in a ready position which allows the user to grip the handcuffs 130. The user 240 having a grip on the handle 147, places each wristlet about separate wrists 234 and 236, respectively, of the individual. When the user 240 is finished with needing the handcuffs 130, the handcuffs 130 are removed from the wrists of the individual and moved to the folded position and stored for future use.

The handcuffs 130 and 170 are applied the same way every time, in every situation, on every offender, by every officer. The handcuffs provide a law enforcement officer complete ergonomic control and leverage. The officer can remove their handcuffs from the pouch knowing they are in perfect position to apply without ever looking at them; allowing the officer to keep his/her full and complete attentive focus on the offender. The handcuffs may be placed in a pouch folded or opened. All officers know that, "Time is of the essence." The longer it takes to cuff, the chance grows by the second that a compliant offender can become resistant, and possibly combative. According to statistics, 70% of all offenders resist, at some level, when being handcuffed. Most of those offenders are intoxicated or under the influence of drugs.

Once the gripping portions or single bars are correctly facing the offender, the officer must apply the cuffs as quickly and carefully as possible. The ratchet teeth on the single bar passes by the officer's hands. At times the teeth will scrape, pinch or cut the hands or fingers of the officer; which can lead to cutting them. If an offender becomes less than compliant, and the officer does not have a strong grip and control of the handcuffs, the single swing bar and/or ratchet teeth can cut or pinch the wrist, hands or arms of the offender. Obviously, when blood is introduced during an arrest, it creates another type of dangerous risk, blood borne pathogens, including Hepatitis and HIV. The handcuffs 10 gripping portions provide total protection to the officer's hands and fingers. The spine provides the greatest control limiting the offender's ability to move, twist or resist. The handcuffs 10 provide the greatest protection for officers and offenders.

The handcuffs provide leverage no other handcuff can provide. Because a majority of offenders (70%) resist while being handcuffed, it is imperative the officer always maintain complete control of the handcuffs. By holding and manipulating the spine, the officer has total control and can apply the appropriate leverage at all times.

The handcuffs can provide pain compliance when needed. For an officer who is smaller than an offender, it can be critical, if not life-saving to have this ability. Offenders tend to resist after the first cuff is on. With traditional cuffs, it is difficult to keep control of them once the offender begins moving his arms and hands. But with the handcuffs, an officer can easily hold on to the spine and simultaneously apply leverage creating controlled pain compliance. This will subdue the offender and allow to officer, if needed, to bring the offender to his knees thus, reducing his ability to move, resist or escape.

The handcuffs are the first ergonomically-created handcuff to provide a safe, efficient and fail proof technique to protect the officer and offender. With the handcuffs, an officer will never need to look at, fumble around with, or adjust his cuffs after removing them from the pouch. In any kind of condition or environment, including darkness, rain, ice, mud, sweaty heat or in pepper spray fog, an officer will have complete confidence and control of his handcuffs, even when wearing gloves. If and when an offender becomes resistant, the officer will be able to hold the handcuffs with strength and the ability to apply controlled pain compliance without risking injury to the officer and the offender.

When removed from the pouch, the handcuffs are always in the perfect posture. In the dark, in a cloud of pepper spray or a fog of mace, even when eyesight has been restricted by dirt or other foreign objects, the handcuffs 10 will always stay in the ready position. They never need to be adjusted.

Quicker and easier to apply to offender's hands. Because time is of the essence, the faster and more efficient handcuffs are applied, the safer it is for all parties. The handcuffs' ergonomic spine protects officer's hands from ratchet teeth and pinching points.

More control. The ergonomic spine allows officers to control the cuffs at all times, even when resistance occurs. Over 70% of all offenders resist while being handcuffed. In 2012, nearly 13 million individuals were handcuffed and over 9 million resisted.

More leverage. The ergonomic spine provides leverage, when needed, to subdue an aggressive or uncooperative offender. Some offenders attempt the "rip technique" yanking the handcuffs from the officers after the first cuff is applied. With the handcuffs, the officer can apply pain compliance by using the spine as a lever. This not only reduces the offender's movements, but it gives the officer greater strength against a larger offender.

Better grip. In any type of environment, including rain, sweaty hot summers, or wearing gloves in the cold winter, the latex grips provide a superior hold. If any liquid or substance, including mud, blood or beer, get on the cuffs, the spine's latex covering delivers a secure and powerful gripping surface.

Easier and Safer Transportation. The handcuffs make it easier and safer to transport offenders without pinching, scraping and cutting officer's hands. The ergonomic spine allows officers to move offenders quickly and easily while still maintaining total control.

Less Physical Contact. The handcuffs provide minimum physical contact. This protects both parties and contributes to less confrontational encounters. According to criminal psychologists, every time an offender is physically touched, the more likely the offender may become less cooperative and possibly move from a passive attitude to an aggressive one.

It should be understood that changes may be made in the operation and the setup of the various embodiments.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A pair of handcuffs, comprising:
   a first handcuff portion having a first wristlet and a first gripping portion;
   a second handcuff portion having a second wristlet and a second gripping portion wherein;
   each wristlet is capable of being positioned about a wrist of a first individual and each gripping portion is attached to the wristlet such that the gripping portions are positioned so that a second individual can grip the gripping portions, wherein each gripping portion has a first portion and a second portion such that the first portion is positioned along a portion of the wristlet at a fixed angle toward the second portion of the gripping portion such that intersection of the first portion and the second portion of the gripping portion is less than 90° and each of the second portions is connected with a connecting member.

2. The pair of handcuffs of claim 1 wherein the first portion of each gripping portion has a substantially curved portion.

3. The pair of handcuffs of claim 1 wherein each gripping portion is provided with a finger portion which allows for placement of a user's hand when gripping the gripping portion of the handcuffs.

4. The pair of handcuffs of claim 1 movable between a closed position and an open position, in the closed position, the first handcuff portion is moved in a direction toward the second handcuff portion so as to fold the first and second handcuff portions over on one another, and in the open position, the first and second handcuff portions are moved in a direction away from one another.

5. The pair of handcuffs of claim 4 wherein the gripping portions are moved into the open position to form a fixed handle for the second individual to grip to use the pair of handcuffs.

6. The pair of handcuffs of claim 1 wherein the gripping portion are constructed in a substantially L-shaped configuration.

7. The pair of handcuffs of claim 1 wherein the gripping portion are constructed in a substantially r-shaped configuration.

8. The pair of handcuffs of claim 1 wherein the connecting member includes a spring loaded mechanism which connects the first handcuff portion and the second handcuff portion.

9. The pair of handcuffs of claim 8 wherein the connecting member moves the first and second handcuff portions between a closed position and an open position wherein in the closed position, a spring exerts constant pressure on the first and second handcuff portions and in the open position, the stored energy is released and the spring exerts the first and second handcuff portions to open and lock the handcuffs into a ready position.

10. The pair of handcuffs of claim 9 wherein the operation of the spring loaded mechanism is initiated by depressing a button, tab or lever.

11. A gripping portion attachable to a pair of handcuffs, comprising:
    a first gripping portion having a first portion and a second portion wherein the first portion of the first gripping portion is attachable to a first wristlet of the pair of handcuffs; and
    a second gripping portion having a first portion and a second portion, wherein the first portion of the second gripping portion is attachable to a second wristlet of the pair of handcuffs wherein the first portion of the first gripping portion is positioned at a fixed angle toward the second portion of the first gripping portion such that intersection of the first portion and the second portion of the first gripping portion is less than 90° and the first portion of the second gripping portion is positioned at a fixed angle toward the second portion of the second gripping portion such that intersection of the first portion and the second portion of the second gripping portion is less than 90° so that the first gripping portion is connectable to the second gripping portion.

12. The gripping portion of claim 11 wherein the connection between the first gripping portion and the second gripping portion is foldable.

13. The gripping portion of claim 11 wherein the gripping portion is movable between a closed position and an open position, in the closed position, the first gripping portion is moved in a direction toward the second gripping portion so as to fold the first and second gripping portions over on one another, and in the open position, the first and second gripping portions are moved in a direction away from one another.

14. The gripping portion of claim 13 wherein the first and second gripping portions are moved into the open position to form a fixed handle for a first individual to grip the gripping portion.

* * * * *